United States Patent
Ito

(10) Patent No.: US 10,858,526 B2
(45) Date of Patent: Dec. 8, 2020

(54) WATER-BASED INK COMPOSITION FOR INK JET RECORDING AND COLORING MATERIAL LIQUID

(71) Applicant: Seiko Epson Corporation, Tokyo (JP)

(72) Inventor: Hiroshi Ito, Matsumoto (JP)

(73) Assignee: Seiko Epson Corporation (JP)

(*) Notice: Subject to any disclaimer, the term of this patent is extended or adjusted under 35 U.S.C. 154(b) by 235 days.

(21) Appl. No.: 15/897,493

(22) Filed: Feb. 15, 2018

(65) Prior Publication Data

US 2018/0273788 A1 Sep. 27, 2018

(30) Foreign Application Priority Data

Mar. 24, 2017 (JP) ................................ 2017-059081

(51) Int. Cl.
| | | |
|---|---|---|
| C09D 11/38 | (2014.01) | |
| C09D 11/03 | (2014.01) | |
| C09D 11/324 | (2014.01) | |
| C09D 11/328 | (2014.01) | |
| C09D 11/322 | (2014.01) | |

(52) U.S. Cl.
CPC .............. *C09D 11/38* (2013.01); *C09D 11/03* (2013.01); *C09D 11/324* (2013.01); *C09D 11/328* (2013.01)

(58) Field of Classification Search
None
See application file for complete search history.

(56) References Cited

U.S. PATENT DOCUMENTS

| 6,742,886 | B1* | 6/2004 | Ray | B41C 1/1066 101/457 |
|---|---|---|---|---|
| 9,688,865 | B2* | 6/2017 | Ito | C09D 11/322 |
| 9,695,330 | B2* | 7/2017 | Ito | C09D 11/033 |
| 9,708,500 | B2* | 7/2017 | Ito | C09D 11/033 |
| 2003/0058318 | A1 | 3/2003 | Sago et al. | |
| 2004/0244645 | A1* | 12/2004 | Doi | C09D 11/40 106/31.58 |
| 2008/0207820 | A1* | 8/2008 | Brust | C09D 11/322 524/507 |
| 2009/0043037 | A1* | 2/2009 | Nakakuma | C08J 7/04 524/503 |
| 2010/0092669 | A1* | 4/2010 | Irving | C09D 11/324 427/256 |
| 2011/0141190 | A1* | 6/2011 | Moribe | C09D 11/324 347/21 |
| 2012/0026257 | A1* | 2/2012 | Robertson | C09D 11/30 347/86 |
| 2016/0289460 | A1 | 10/2016 | Ito | |
| 2017/0009093 | A1* | 1/2017 | Ito | C09D 11/30 |
| 2018/0273780 | A1* | 9/2018 | Ito | C09D 11/107 |
| 2018/0346745 | A1* | 12/2018 | Ito | C09D 11/107 |

FOREIGN PATENT DOCUMENTS

| CA | 1315783 C | 4/1993 |
|---|---|---|
| JP | 2003-183558 A | 7/2003 |
| JP | 2010-195972 A | 9/2010 |
| JP | 2010-222417 A | 10/2010 |
| JP | 2011-046624 A | 3/2011 |
| JP | 2016-194012 A | 11/2016 |

OTHER PUBLICATIONS

4-Hydroxycinnamic acid Datasheet; National Center for Biotechnology Information, PubChem Database, 4-Hydroxycinnamic acid, CID=637542, https://pubchem.ncbi.nlm.nih.gov/compound/4-Hydroxycinnamic-acid, no date available; 41 pages.*
Extended European Search Report for Patent Application No. 18160700.3 dated Jun. 6, 2018 (6 pages).

* cited by examiner

*Primary Examiner* — Helene Klemanski
(74) *Attorney, Agent, or Firm* — Harness, Dickey & Pierce, P.L.C.

(57) ABSTRACT

A water-based ink composition for ink jet recording and a coloring material liquid according to an aspect includes at least one selected from the group consisting of vinylphenol and a vinylphenol derivative, a water-soluble organic solvent, and water.

8 Claims, No Drawings

WATER-BASED INK COMPOSITION FOR INK JET RECORDING AND COLORING MATERIAL LIQUID

BACKGROUND

1. Technical Field

The present invention relates to a water-based ink composition for ink jet recording and a coloring material liquid.

2. Related Art

In an ink jet recording method, it is possible to record high-definition images with a relatively simple apparatus, and a rapid development is obtained in various fields. However, in water-based ink composition (hereinafter simply referred to as "ink"), microorganisms may proliferate during storage. When the microorganisms grow in the ink, the pH of the ink decreases, the ink components sinks, and the like, which may cause deterioration of the ink and nozzle clogging. Therefore, various improvements have been made to the storage properties of the ink, since it is desired to impart preservative performance to the ink without using a biocidal preservative from the viewpoint of consideration to the human body and the environment.

Therefore, for example, JP-A-2011-046624 discloses the use of 1,2-benzisothiazolin-3-one as a preservative and antibacterial agent used in inks. In addition, for example, JP-A-2003-183558 discloses mixing Proxel XL 2S as an antiseptic and antifungal agent in a water-based pigment ink for ink jet. Furthermore, JP-A-2010-222417 discloses a water-based ink composition obtained by heat-treating a pigment dispersion containing sodium benzoate as a preservative and antifungal agent, and a glycerin ether compound as a wetting agent.

However, preservative and antifungal agents have biocidal properties, and when label printing or textile printing is performed using an ink containing these substances, skin sensitization may occur when the printed matter touches the skin. For example, since the minimum growth inhibitory concentration of a preservative and antifungal agent against microorganisms is from several tens to several hundred ppm, the concentration of the preservative and antifungal agent at the time of ink addition is at most approximately 500 ppm, and the safety of the ink itself is high. However, after printing is performed and liquid components are separated, the preservative and antifungal agent concentrates on the printed surface to a concentration of approximately 10 to 20 times the concentration at the time of ink addition.

In addition, the preservative and antifungal agents described above have low volatility and re-solubility after drying in order to maintain preservative properties and are likely to remain in the printed surface. Therefore, for example, in a case where a printing base material is a film, the concentration of the preservative on the front surface of the printing surface is likely to be high, and the printed matter obtained by label printing, package printing, and textile printing is likely to come into contact with the skin at the time of use. Therefore, a safer ink is required for these applications.

Furthermore, although sodium benzoate blended in JP-A-2010-222417 is a relatively safe preservative and antifungal agent, a material with higher safety is required. In addition, since sodium benzoate is ionic, it is likely to cause insolubilization of the dye and coagulation of the dispersed pigment when added to the ink, which may impair the storage stability of the ink.

SUMMARY

An advantage of some aspects of the invention is to provide a water-based ink composition for ink jet recording and a coloring material liquid, which is safe without risk of skin sensitization, excellent in preservative performance, and high in discharge stability and storage stability.

The invention can be realized in the following aspects or application examples.

According to an aspect of the invention, there is provided a water-based ink composition for ink jet recording that includes:
at least one compound selected from the group consisting of vinylphenol and vinylphenol derivatives;
a water-soluble organic solvent; and
water.

According to this aspect, the ink includes at least one compound selected from the group consisting of vinylphenol and vinylphenol derivatives; and a water-soluble organic solvent, so that the ink has preservative properties without using a biocidal preservative. In addition, since the ink includes a water-soluble organic solvent and water, the vinylphenol and/or the vinylphenol derivatives can be solubilized in the ink, so that the ink has discharge stability and storage stability. Therefore, it is possible to provide a water-based ink composition for ink jet recording which is safe in that it reduces or prevents the risk of skin sensitization, has excellent preservative performance, and has high discharge stability and storage stability.

It is preferable that a coloring material be further included in the water-based ink composition for ink jet recording described above. The coloring material may be at least one selected from the group consisting of a pigment and a dye.

According to this aspect, the invention provides a water-based ink composition for ink jet recording that includes at least one colouring material selected from the group consisting of pigments and dyes, wherein preservative performance is imparted to the ink without using a biocidal preservative.

It is preferable that, in the ink, the content of the at least one compound selected from the group consisting of vinylphenol and a vinylphenol derivative be 0.01% by mass or more and 1.0% by mass or less.

According to the application example, when the content of the at least one compound selected from the group consisting of vinylphenol and a vinylphenol derivative is 0.01% by mass or more and 1.0% by mass or less, both preservative performance, and discharge stability and storage stability can be achieved.

It is preferable that the content of water in the ink be 60% by mass or more.

According to the application example, when the content of water is 60% by mass or more, the viscosity of the ink can be relatively low.

It is preferable that the water-soluble organic solvent has a water-octanol partition coefficient (represented as log P value) of 0.0 or more and 1.5 or less.

According to the application example, when the water-octanol partition coefficient (log P value) of the water-soluble organic solvent is 0.0 or more and 1.5 or less, the vinylphenol and/or the vinylphenol derivative having low water solubility are solubilized in the ink, and the generation of foreign matter and the like is suppressed, so that the storage stability of the ink is improved. In addition, when the water-octanol partition coefficient (log P value) of the water-soluble organic solvent is 0.0 or more and 1.5 or less, the water-soluble organic solvent has preservative properties. The preservative properties of the vinylphenol and/or vinylphenol derivatives combine with those of the water-soluble organic solvent so that it is possible to obtain the preservative performance of the ink using a lower total content of water-soluble solvent and vinylphenol and/or vinylphenol derivative than would be necessary if the water-soluble organic solvent were used alone. Therefore, it is possible to increase the amount of other solvents such as moisturizing agent, and to improve the discharge stability.

In the ink, it is preferable that the water-soluble organic solvent is at least one of a diol-based solvent, a glycol ether-based solvent, and a glycerin ether-based solvent.

Since the water-soluble organic solvent is selected from a diol-based solvent, a glycol ether-based solvent, glycerin ether-based solvent and combinations thereof, the vinylphenol derivative, which has low water solubility, is solubilized in the ink, occurrence of foreign matter is suppressed, and the storage stability of the ink is improved. In addition, the preservative properties of the vinylphenol and/or the vinylphenol derivatives combine with those of the water-soluble organic solvent, so that it is possible to obtain the necessary preservative performance of the ink using a smaller total amount of vinylphenol and/or vinylphenol derivative and water-soluble organic solvent than would be needed using the water-soluble organic solvent alone. Therefore, it is possible to increase the amount of other solvents such as moisturizing agent, and to improve the discharge stability.

In the ink, it is preferable that the content of the water-soluble organic solvent be 0.5% by mass or more and 15% by mass or less.

According to the application example, when the content of the water-soluble organic solvent is 0.5% by mass or more and 15% by mass or less, it is possible to increase the amount of other solvents such as moisturizing agent, and to improve the discharge stability.

The inks may comprise a further biocidal antibacterial agent or antifungal agent other than the vinylphenol and/or vinylphenol derivative. However, it is preferable that such a further biocidal antibacterial agent or antifungal agent should be present in an amount of not more than 1% (e.g. 0-1%) by mass.

According to the application example, even in a case where the biocidal antibacterial agent or antifungal agent other than the vinylphenol and the vinylphenol derivative is not contained more than 1% by mass, it is possible to obtain an ink having sufficient preservative performance.

According to another aspect of the invention, there is provided a coloring material liquid that includes at least one selected from the group consisting of vinylphenol and a vinylphenol derivative; and a water-soluble organic solvent; and water; and a coloring material.

The coloring material liquid includes at least one selected from the group consisting of vinylphenol and the vinylphenol derivative; and the water-soluble organic solvent, so that the coloring material liquid has preservative properties without using a biocidal preservative. In addition, since the coloring material liquid includes a water-soluble organic solvent and water, the vinylphenol and/or the vinylphenol derivative can be solubilized in the coloring material liquid.

Other preferred features of the coloring material liquid are as set out above for the inks.

DESCRIPTION OF EXEMPLARY EMBODIMENTS

Preferred embodiments of the invention will be described below. The embodiments described below describe examples of the invention and the various embodiments described may be combined with one another. In addition, the invention is not limited to the following embodiments, and includes various modified examples that are implemented within the scope not changing the gist of the invention.

1. Water-Based Ink Composition for Ink Jet Recording and Coloring Material Liquid A water-based ink composition (hereinafter, referred to as "ink") for ink jet recording and a coloring material liquid according to one aspect of the invention includes a vinylphenol and/or derivative thereof; and a water-soluble organic solvent; and water. Hereinafter, components contained, and components that can be contained in the water-based ink composition for ink jet recording and the coloring material liquid according to the embodiment will be described.

In the embodiment, the coloring material liquid may be used as an ink or as a component liquid of an ink, in which case the ink may be formed by appropriately adding water, a solvent, and/or other additives and mixing. Therefore, the water-based ink composition for ink jet recording will be mainly described as an example in the following description.

1.1. Vinylphenol and Vinylphenol Derivative

The water-based ink composition for ink jet recording according to the embodiment includes at least one compound selected from the group consisting of vinylphenols and vinylphenol derivatives. Suitably, the vinylphenols and vinylphenyl derivatives used in the ink are compounds of formula (I):

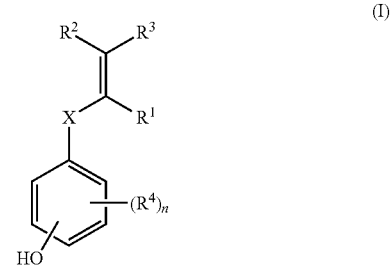

wherein:
X is a bond, —OC(O)— or —NHC(O)—;
$R^1$ is H or methyl;
one of $R^2$ and $R^3$ is H and the other of $R^2$ and $R^3$ is H, —CH$_2$OH or —C(O)OH;
$R^4$ is OH or O(C$_{1-4}$ alkyl); and
n is 0, 1 or 2.

In the vinylphenols and vinylphenol derivatives, the phenol moiety has a preservative function. Therefore, the water-based ink composition for ink jet recording according to the embodiment includes at least one compound selected from the group consisting of vinylphenols and vinylphenol derivatives, for example one or more compounds of formula (I), so that the ink has preservative properties without adding a biocidal preservative. In addition, since the ink includes a water-soluble organic solvent and water, the vinylphenol and/or the vinylphenol derivative can be solubilized in the ink, so that the ink has discharge stability and storage stability. Therefore, it is possible to provide a water-based ink composition for ink jet recording, which has excellent preservative performance and has high the discharge stability and storage stability of the ink. In addition, since the water-based ink composition is safe and reduces or eliminates the risk of skin sensitization, the water-based ink composition is particularly suitable for label printing or textile printing.

The vinylphenols and/or vinylphenol derivatives can be used without any limitation as long as they have the preservative function and are soluble in a mixture of the water-soluble organic solvent and water. Examples of such vinylphenols and the vinylphenol derivatives are compounds of formula (I) above and include vinyl monomers having a phenol skeleton, such as o-vinylphenol, m-vinylphenol, p-vinylphenol, hydroxy-α-methylstyrene, 4-hydroxyphenyl methacrylate, p-hydroxy-2-methylacrylanilide, 4-hydroxyphenyl acrylate, p-hydroxy cinnamic alcohol, 4-hydroxy cinnamic acid, p-sinapyl alcohol, coniferyl alcohol, and the like.

The ink may include a single vinylphenol or vinylphenol derivative or a mixture of two or more such compounds. For example, a single compound of formula (I) or a mixture of two or more compounds of formula (I).

In addition, the content of the vinylphenols and/or vinylphenol derivatives is preferably 0.01% by mass or more and 1.0% by mass or less, more preferably 0.02% by mass or more and 0.9% by mass or less, and still more preferably 0.1% by mass or more and 0.75% by mass or less with respect to the total mass (100% by mass) of the water-based ink composition for ink jet recording. When the content of the vinylphenols and/or vinylphenol derivatives is within the above range, it is possible to further impart the preservative performance to the ink, and to set a viscosity of the ink to an appropriate viscosity suitable for ink jet recording, so that the discharge during ink jet recording is stabilized. Furthermore, the storage stability of the ink is improved.

1.2 Water-Soluble Organic Solvent

The water-based ink composition for ink jet recording contains a water-soluble organic solvent.

It is preferable that the water-octanol partition coefficient (represented as log P value) of the water-soluble organic solvent used in the water-based ink composition for ink jet recording according to the embodiment, is 0.0 or more and 1.5 or less. When the water-octanol partition coefficient (represented as log P value) is 0.0 or more and 1.5 or less as the water-soluble organic solvent, the vinylphenols or vinylphenol derivatives, which have low water solubility, can be solubilized in the ink. Therefore, occurrence of foreign matter and the like is suppressed, and the storage stability of the ink can be improved. In addition, when the water-octanol partition coefficient of the water-soluble organic solvent is 0.0 or more and 1.5 or less, the water-soluble organic solvent has preservative properties. The preservative properties of the water-soluble organic solvent and the vinylphenol and/or vinylphenol derivative combine, so that it is possible to obtain good preservative performance of the ink with a smaller total content of water-soluble solvent and vinylphenol and/or vinylphenol derivative than would be possible using the water-soluble solvent alone. Therefore, it is possible to increase other solvents such as moisturizing agent and the viscosity of the ink can be a viscosity suitable for ink jet recording, so that the discharge stability can be improved.

In the present specification, the water-octanol partition coefficient is as defined by OECD Test Guideline 107 and is represented in terms of its logarithm in base 10 (log P). The log P value gives an indication of the hydrophobicity or hydrophilicity of a solvent. Thus, the higher the log P value, the higher the hydrophobicity, and the lower the log P value, the higher the hydrophilicity. In the water-soluble organic solvent having a water-octanol partition coefficient (log P value) of 0.0 or more and 1.5 or less, the water-soluble organic solvent itself has preservative properties.

In the water-based ink composition for ink jet recording according to the embodiment, the water-octanol partition coefficient (log P value) of the water-soluble organic solvent is preferably 0.1 or more and 1.4 or less, and more preferably 0.2 or more and 1.2 or less. In a case where the water-octanol partition coefficient (log P value) is within the above range, it is possible to sufficiently ensure the preservative performance of the water-based ink composition for ink jet recording and the vinylphenol and/or vinylphenol derivative, which have low water solubility, can be solubilized in the ink.

The water-soluble organic solvent having a water-octanol partition coefficient (log P value) of 0.0 or more and 1.5 or less is not particularly limited, and examples thereof include diol-based solvents, glycol ether-based solvents, and glycerin ether-based solvents. Examples of the diol-based solvents include 1,2-pentanediol (log P: 0.01), 1,2-hexanediol (log P: 0.70), 1,3-hexanediol (log P: 0.28), 1,2-heptane diol (log P: 1.0), 1,2-octanediol (log P: 1.32), and the like. Examples of glycol ether-based solvents include butyl triglycol (log P: 0.5), butyl diglycol (log P: 0.56), propylene glycol monopropyl ether (log P: 0.61), dipropylene glycol monopropyl ether (log P: 0.60), propylene glycol monobutyl ether (log P: 1.14), and the like. Examples of glycerin ether-based solvents include 3-butoxy-1,2-propanediol (log P: 0.59), 3-pentyloxy-1,2 propanediol (log P: 0.83), 3-(hexyloxy)-1,2-propanediol (log P: 1.36), and the like.

The ink may include a single solvent or a mixture of solvents of the same type or a mixture of solvents of different types. Among these, 1,2-pentanediol or 3-(hexyloxy)-1,2-propanediol is particularly preferably used since the preservative performance can be secured using a small amount of this solvent.

The content of the water-soluble organic solvent having the water-octanol partition coefficient (log P value) of 0.0 or more and 1.5 or less is preferably 0.5% by mass or more and 15% by mass or less, more preferably 1.0% by mass or more and 12% by mass or less, and still more preferably 2.0% by mass or more and 10% by mass or less with respect to the total amount (100% by mass) of the water-based ink composition for ink jet recording, from the viewpoint of ensuring compatibility with other components, discharge stability, storage stability, and preservative performance. When the content of the water-soluble organic solvent is 0.5% by mass or more and 15% by mass or less, it is possible to sufficiently ensure the preservative performance of the water-based ink composition for ink jet recording, and to increase other solvents such as moisturizing agent, so that the discharge stability can be improved.

1.3. Water

The water-based ink composition for ink jet recording according to the embodiment contains water. Examples of the water include pure water such as ion exchanged water, ultrafiltered water, reverse osmosis water, and distilled water, and water obtained by removing ionic impurities as much as possible, such as ultrapure water. In addition, when water sterilized by ultraviolet irradiation or addition of hydrogen peroxide is used, generation of bacteria and fungi can be prevented in a case where the water-based ink composition for ink jet recording is to be preserved for a long time.

The content of water is preferably 60% by mass or more, more preferably 65% by mass or more, still more preferably 70% by mass or more with respect to the total amount (100% by mass) of the water-based ink composition for ink jet recording. When the water content is 60% by mass or more, the water-based ink composition for ink jet recording has a relatively low viscosity. In addition, when the water content is 60% by mass or more, compatibility with the water-soluble organic solvent is improved, and the discharge stability and storage stability of the water-based ink composition for ink jet recording is improved. In addition, the upper limit of the content of water is preferably 90% by mass or less, more preferably 85% by mass or less, and still more preferably 80% by mass or less with respect to the total amount of the water-based ink composition for ink jet recording.

1.4. Coloring Material

The water-based ink composition for ink jet recording and the coloring material liquid according to the embodiment may contain a coloring material. Either a pigment or a dye can be used as the coloring material.

Examples of pigments include inorganic pigments, organic pigments, and the like. The inorganic pigment is not particularly limited, and examples thereof include carbon black (C.I. Pigment Black 7) such as furnace black, lamp black, acetylene black and channel black, iron oxide, titanium oxide, zinc oxide, silica, and the like.

The organic pigment is not particularly limited, and examples thereof include a quinacridone-based pigment, a quinacridone quinone-based pigment, dioxazine-based pigment, phthalocyanine-based pigment, anthrapyrimidine-based pigment, anthanthrone-based pigment, indanthrone-based pigment, flavanthrone-based pigment, perylene-based pigment, diketopyrrolopyrrole-based pigment, perinone-based pigment, quinophthalone-based pigment, anthraquinone-based pigment, thio indigo-based pigment, benzimidazolone-based pigment, isoindolinone-based pigment, azomethine-based pigment, an azo-based pigment, and the like.

The pigment may be dispersed in an ink or coloring material liquid by using a dispersant selected from the vinylphenol derivative, a water-dispersible resin, and a surfactant, or may be used as a self-dispersion pigment by oxidizing or sulfonating the pigment surface with ozone, hypochlorous acid, fuming sulfuric acid or the like.

In the inks and coloring material liquids, one type of pigment may be used alone or two or more types may be used in combination.

The dyes which may be used in the inks and coloured compositions are not particularly limited and include water-soluble dyes and water-dispersible dyes. Examples of water-soluble dyes include an acidic dye, a direct dye, a reactive dye, and a basic dye, and examples of water-dispersible dyes include a disperse dye, an oil soluble dye, and the like. More specifically, examples of the acidic dyes include C.I. Acid Yellow 17, 23, 42, 44, 79, 142, C.I. Acid Red 52, 80, 82, 249, 254, 289, C.I. Acid Blue 9, 45, 249, C.I. Acid Black 1, 2, 24, 94, and the like. Examples of the direct dyes include C.I. Direct Yellow 1, 12, 24, 33, 50, 55, 58, 86, 132, 142, 144, 173, C.I. Direct Red 1, 4, 9, 80, 81, 225, 227, C.I. Direct Blue 1, 2, 15, 71, 86, 87, 98, 165, 199, 202, C.I. Direct Black 19, 38, 51, 71, 154, 168, 195, C.I. Direct Blue 2, 3, 8, 10, 12, 31, 35, 63, 116, 130, 149, 199, 230, 231 and the like. Examples of the reactive dyes include C.I. Reactive Yellow 2, 7, 15, 22, 37, 42, 57, 69, 76, 81, 95, 102, 125, 135, C.I. Reactive Red 2, 14, 24, 32, 55, 79, 106, 111, 124, C.I. Reactive Blue 2, 13, 21, 38, 41, 50, 69, 72, 109, 120, 143, C.I. Reactive Black 3, 4, 5, 8, 13, 14, 31, 34, 35, 39, and the like. Examples of the basic dyes include C.I. Basic Yellow 1, 2, 13, 19, 21, 25, 32, 36, 40, 51, C.I. Basic Red 1, 5, 12, 19, 22, 29, 37, 39, 92, C.I. Basic Blue 1, 3, 9, 11, 16, 17, 24, 28, 41, 45, 54, 65, 66, and C.I. Basic Black 2, 8, and the like. Examples of the disperse dyes include C.I. Disperse Red 60, 82, 86, 86:1, 167:1, 279, C.I. Disperse Yellow 64, 71, 86, 114, 153, 233, 245, C.I. Disperse Blue 27, 60, 73, 77, 77:1, 87, 257, 367, C.I. Disperse Violet 26, 33, 36, 57, C.I. Disperse Orange 30, 41, 61 and the like. Examples of the oil soluble dyes include C.I. Solvent Yellow 16, 21, 25, 29, 33, 51, 56, 82, 88, 89, 150, 163, C.I. Solvent Red 7, 8, 18, 24, 27, 49, 109, 122, 125, 127, 130, 132, 135, 218, 225, 230, C.I. Solvent Blue 14, 25, 35, 38, 48, 67, 68, 70, 132, C.I. Solvent Black 3, 5, 7, 27, 28, 29, 34, and the like.

One dye or type of dye may be used alone or a combination of dyes of the same type or different types may be used. Furthermore, a mixture of the dye and the pigment may be used.

The content of the coloring material can be appropriately adjusted depending on the application, and it is preferably 0.10% by mass or more and 30.0% by mass or less, more preferably 0.20% by mass or more and 20.0% by mass or less, and still more preferably 1.0% by mass or more and 10.0% by mass or less with respect to the total amount (100% by mass) of the water-based ink composition for ink jet recording.

1.5. Moisturizing Agent

The water-based ink composition for ink jet recording according to the embodiment may further contain a moisturizing agent (wetting agent). The moisturizing agent is not particularly limited and can be used as long as it is generally used for ink composition for ink jet recording. The standard boiling point of the moisturizing agent is preferably 180° C. or higher, more preferably 180° C. or higher and 250° C. or lower in the standard boiling point range for the water-based ink composition for ink jet recording used for an evaporation drying type ink, and more preferably 200° C. or higher for the water-based ink composition for ink jet recording used for a penetration drying type ink. When the standard boiling point is within the above range, good water retention and wettability can be imparted to the ink composition.

The moisturizing agent is not particularly limited, and examples thereof include polyols such as diethylene glycol, triethylene glycol, tetraethylene glycol, pentamethylene glycol, trimethylene glycol, 2-butene-1,4-diol, 2-ethyl-1,3-hexanediol, 2-methyl-2,4-pentanediol, tripropylene glycol, isobutylene glycol, glycerin, diglycerin, mesoerythritol, trimethylolpropane, ditrimethylolpropane, pentaerythritol, dipentaerythritol, lactams such as 2-pyrrolidone and ε-caprolactam, urea derivatives such as urea, thiourea, ethylene urea, 1,3-dimethylimidazolidinones, monosaccharides such as glucose, mannose, fructose, ribose, xylose, arabinose, galactose, aldonic acid, glucitol (sorbit), maltose, cellobiose, lactose, sucrose, trehalose, and maltotriose, disaccharides, oligosaccharides, polysaccharides, and derivatives of these saccharides, glycine, betaines of trimethylglycine, and the like. Among these, glycerin and trimethylolpropane are particularly preferably used.

One type of moisturizing agent may be used alone or two or more types may be used in combination.

The content of the moisturizing agent can be appropriately adjusted depending on the application, and it is preferably 5.0% by mass or more and 30% by mass or less, more preferably 7% by mass or more and 25% by mass or less, and still more preferably 10% by mass or more and 20% by mass or less with respect to the total amount (100% by mass) of the water-based ink composition for ink jet recording according to the embodiment.

1.6. Surface Tension Adjusting Agent

The water-based ink composition for ink jet recording according to the embodiment may further contain a surface tension adjusting agent. The surface tension adjusting agent is used for lowering the surface tension at the time of dissolution of water to adjust the wettability of an ink printing substrate, a discharge flow path, and a discharge head. In the embodiment, the surface tension adjusting agent is selected from a water-soluble solvent having low surface tension and a surfactant.

The water-soluble solvent having low surface tension is not particularly limited, and for example, lower alcohols such as ethanol, propanol, and butanol, diols such as butylene glycol, 1,3-pentanediol, 2-ethyl-1,3-propanediol, and 1,6-hexanediol, glycol monoethers such as ethylene glycol monomethyl ether, ethylene glycol monoethyl ether, diethylene glycol monomethyl ether, diethylene glycol monoethyl ether, and propylene glycol monomethyl ether are used. The surfactant type is not particularly limited, and it can be appropriately selected from, for example, a nonionic surfactant, an anionic surfactant, a cationic surfactant, and an amphoteric surfactant. In particular, it is preferable to use an acetylene glycol-based surfactant and a silicone-based surfactant having high surface activity and low foaming properties.

The acetylene glycol-based surfactant is not particularly limited, and examples thereof include olfine E1004, E1010, E1020, PD-001, PD-002W, PD-004, PD-005, EXP. 4200, EXP. 4123, EXP. 4300 (hereinbefore, all of these are trade names, manufactured by Nissin Chemical Industry Co., Ltd.), surfynol 440, 465, 485, CT111, CT121, TG, GA, dynol 604, 607, olfine 104 series, E series such as olfine E1010 (hereinbefore, all of these are trade names, manufactured by Air Products Japan, Inc.), acetylenol E40, E60, E100 (hereinbefore, all of these are trade names, manufactured by Kawasaki Fine Chemical Co., Ltd.), and the like. One type of acetylene glycol-based surfactant may be used alone or two or more types may be used in combination.

Examples of the silicone-based surfactant include a polysiloxane-based compound, a polyether modified organosiloxane, and the like. The commercially available silicone-based surfactant is not particularly limited, and examples thereof include, BYK-306, BYK-307, BYK-333, BYK-341, BYK-345, BYK-346, BYK-347, BYK-348, BYK-349 (hereinbefore, trade names, manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, (hereinbefore, trade names, manufactured by Shin-Etsu Chemical Co., Ltd.), Silface SAG002, 005, 503A, 008 (hereinbefore, trade names, manufactured by Nisshin Chemical Industry Co., Ltd.), and the like.

The content of the surface tension adjusting agent is preferably 0.10% by mass or more and 2.5% by mass or less, more preferably 0.20% by mass or more and 1.5% by mass or less, and still more preferably 0.40% by mass or more and 1.25% by mass or less with respect to the total amount (100% by mass) of the water-based ink composition for ink jet recording. When the content of the surface tension adjusting agent is within the above range, the wettability of the water-based ink composition for ink jet recording on the recording medium can be appropriately adjusted.

1.7. Fixing Resin

In the water-based ink composition for ink jet recording according to the embodiment may contain a fixing resin. The fixing resin is mainly added in a case where the coloring material is a pigment and used for improving the fixing property of the pigment to the recording medium.

The fixing resin is not particularly limited, and for example, any of a water-soluble resin and a water-dispersible resin can be used. Specifically, an acrylic polymer such as polyacrylic acid ester or a copolymer thereof, polymethacrylic acid ester or a copolymer thereof, polyacrylonitrile or a copolymer thereof, polycyanoacrylate, polyacrylamide, polyacrylic acid or polymethacrylic acid; a polyolefin polymer such as polyethylene, polypropylene, polybutene, polyisobutylene, polystyrene or a copolymer thereof, a petroleum resin, a coumarone-indene resin, or a terpene resin; a vinyl acetate-vinyl alcohol polymer such as polyvinyl acetate or a copolymer thereof, polyvinyl alcohol, polyvinyl acetal, or polyvinyl ether; a halogen-containing polymer such as polyvinyl chloride or a copolymer thereof, polyvinylidene chloride, a nitrogen-containing vinyl polymer such as polyvinylcarbazole, polyvinylpyrrolidone or a copolymer thereof, polyvinylpyridine, or polyvinylimidazole; a diene polymer such as polybutadiene or a copolymer thereof, polychloroprene, or polyisoprene (butyl rubber); other ring-opening polymerization type resin, a condensation polymerization type resin, a natural polymer resin, or the like can be used.

One type of fixing resin may be used alone or two or more types may be used in combination.

The content of the fixing resin can be appropriately adjusted depending on the application, and it is preferably 1.5% by mass or more and 5% by mass or less with respect to the total amount (100% by mass) of the water-based ink composition for ink jet recording. When the content of the fixing resin is within the above range, the adhesion of the pigment to the recording medium is improved.

1.8. pH Adjusting Agent

The water-based ink composition for ink jet recording according to the embodiment may further contain a pH adjusting agent for the purpose of adjusting the pH of the ink. The pH adjusting agent is not particularly limited, and examples thereof include triethanolamine, diethanolamine, monoethanolamine, triisopropanolamine, diisopropanolamine, trishydroxymethylaminomethane as an organic base, and adipic acid, citric acid, succinic acid, lactic acid, and the like as an organic acid.

One type of pH adjusting agent may be used alone or two or more types may be used in combination.

The content of the pH adjusting agent can be appropriately adjusted, and the pH adjusting agent can be preferably added so that the ink pH is 7.0 or more and 10.0 or less.

1.9 Other Components

In order to maintain good storage stability and discharge stability from the head and to improve clogging, or to prevent deterioration of the water-based ink composition for ink jet recording, the water-based ink composition for ink jet recording according to the embodiment may appropriately add various additives such as a dissolution aid, a viscosity adjusting agent, an antioxidant, and a chelating agent for capturing metal ions affecting dispersion.

The water-based ink composition for ink jet recording according to the embodiment includes at least one compound selected from the group consisting of vinylphenols and the vinylphenol derivatives; and a water-soluble organic solvent, so that it is possible to impart the preservative performance to the ink without separately using a biocidal preservative. Therefore, if a biocidal preservative is present, it is not necessary to include more than 1% by mass. Therefore, the ink may include a biocidal preservative in an amount of less than or equal to 1% by mass with respect to the total amount (100% by mass) of the water-based ink composition for ink jet recording. Suitable biocidal preservatives include a biocidal antibacterial agent, a microbicide, an antifungal agent, a preservative or the like as used in a water-based ink composition in the related art.

As such a biocidal compound, examples of the isothiazoline compounds include 1,2-benzisothiazolin-3-one (BIT), 3-methyl-4-isothiazolin-3-one (MIT), 5-chloro-2-methyl-4-isothiazoline-3-one (CMI), 2-octyl-4-isothiazolin-3-one (OIT), 4,5-dichloro-2-octyl-4-isothiazolin-3-one (2Cl-OIT), and the like. Examples of the fumaric acid ester-based compound include dimethyl fumarate (DMF), diethyl fumarate (DEF), dibutyl fumarate (DBF), and the like. In addition, 2-bromo-2-nitropropane-1,3-diol (bronopol), 2,2-dibromo-3-nitrile propionamide (DBNPA), and the like can be included.

1.10. Method for Preparing Water-Based Ink Composition for Ink Jet Recording

The water-based ink composition for ink jet recording according to the embodiment can be prepared by mixing the above components. The mixing method is not particularly limited, and a known method in the related art can be used. In addition, the coloring material liquid according to the embodiment may be used as it is as the water-based ink composition for ink jet recording, and the water-based ink composition for ink jet recording according to the embodiment may be prepared by appropriately adding water, a solvent and other additives to the coloring material liquid and mixing.

1.11 Physical Properties

The surface tension of the water-based ink composition for ink jet recording according to the embodiment at 20° C. is preferably 20 mN/m or more and 50 mN/m or more, and more preferably 25 mN/m or more and 40 mN/m or less, from the viewpoint of balance between recording quality and reliability as an ink composition for ink jet. The surface tension can be measured by confirming the surface tension when a platinum plate is wetted with ink under an environment of 20° C., using an automatic surface tensiometer CBVP-Z (manufactured by Kyowa Interface Science Co., Ltd.).

In addition, the viscosity of the water-based ink composition for ink jet recording according to the embodiment at 20° C. is preferably 2 mPa·s or more and 30 mPa·s or less, and more preferably 2 mPa·s or more and 20 mPa·s or less from the same viewpoint. The viscosity can be measured by raising Shear Rate to 10 to 1,000 under an environment of 20° C. and reading the viscosity at Shear Rate 200, using a viscoelasticity tester MCR-300 (manufactured by Pysica Corporation).

1.12. Application

The water-based ink composition for ink jet recording according to the embodiment is contained in an ink cartridge of a known ink jet recording apparatus, and ink droplets are discharged, and the droplets are adhered to a recording medium such as paper to record an image. As the ink jet recording apparatus, an ink jet recording apparatus configured to be capable of mounting a vibratable electrostrictive element on the basis of an electric signal, and to be capable of discharging ink by vibration of the electrostrictive element is preferable.

Examples of the methods of discharging the water-based ink composition for ink jet recording from the nozzle include a method in which a strong electric field is applied between accelerating electrodes placed in front of the nozzle and the nozzle to discharge droplets of ink continuously from the nozzles, and the droplets of the ink are discharged in accordance with the recording information signal while the droplets of the ink fly between the deflecting electrodes (electrostatic suction method); a method in which pressure is applied to the ink with a small pump and the nozzle is mechanically vibrated by a crystal oscillator or the like to forcibly discharge the droplets of the ink; a method in which pressure and a recording information signal are simultaneously applied to ink by a piezoelectric element to discharge and record the droplets of the ink (piezo method); a method in which ink is heated and foamed with a microelectrode according to a recording information signal, and droplets of ink are discharged and recorded (thermal jet method), and the like.

As the ink jet head, either a line type ink jet head or a serial type ink jet head can be used.

In the embodiment, the recording medium to be printed is not particularly limited and the embodiment can be used for various recording media. The embodiment can be used not only for fabrics such as cotton, silk, polyester, polyurethane, and nylon with high ink absorbency, exclusive paper for ink jet, wood free paper with moderate absorbency, copy paper, but also for coated paper and plastic film with low absorbency or non-absorbency.

The recording medium with low absorbency is not particularly limited, and for example, a coated paper having a coating layer formed by applying a coating material on the surface can be mentioned. The coated paper is not particularly limited, and examples thereof include printing paper such as art paper, coated paper, and matte paper.

The recording medium with non-absorbency is not particularly limited, but examples thereof include a plastic film not having an ink absorption layer, a medium coated with plastic on a base material such as paper, a medium having a plastic film bonded thereto, and the like. Examples of plastics here include polyvinyl chloride, polyethylene terephthalate, polycarbonate, polystyrene, polyurethane, polyethylene, polypropylene, and the like.

Here, "recording medium with low absorbency" or "recording medium with non-absorbency" refers to a medium to be recorded having a water absorption amount of 10 mL/m$^2$ or less from contact start to 30 msec in the Bristow method. The Bristow method is the most popular method as a method for measuring the amount of liquid absorption in a short time and is adopted by Japan Paper and Pulp Technology Association (JAPAN TAPPI). Details of the test method are described in a "paper and paperboard—liquid absorption test method—Bristow method" of the standard No. 51 of "JAPAN TAPPI paper pulp test method 2000 edition".

In the water-based ink composition for ink jet recording according to the embodiment, the ink includes at least one selected from the group consisting of the vinylphenol and the vinylphenol derivative and the water-soluble organic solvent, so that the ink has the preservative properties without using the biocidal preservative. In addition, since the ink includes the water-soluble organic solvent and water, the vinylphenol derivative can be solubilized in the ink, so that the ink has the discharge stability and storage stability. Therefore, the ink is safe without risk of skin sensitization, excellent in the preservative performance, and has high discharge stability and storage stability. In particular, since the ink is safe without risk of skin sensitization, the ink can be suitably used for an application in which the skin is likely to be come into contact with at the time of using the printed matter such as label printing, package printing, and textile printing.

2. Example

Hereinafter, the invention will be described more specifically with reference to examples and comparative examples, and the invention is not limited to only these examples.

2.1. Preparation of Water-Based Ink Composition for Ink Jet Recording

Prior to performing various evaluations, water-based ink compositions for ink jet recording of Examples and Comparative Examples were prepared. The materials are as described in Table 1 below.

mixed with the water-soluble dye solution of Example 1 to prepare an ink of Comparative Example 1.

Comparative Example 2

In contrast to Example 3, instead of adding a p-hydroxy cinnamic acid serving as the vinylphenol derivative, the preservative properties were maintained by increasing the amount of 3-hexyloxy-1,2-propanediol as shown in Table 1 to prepare an ink of Comparative Example 2.

Details of the components used in Table 1 are as follows.

Cyan dye solution: C.I. Direct Blue 199 solution (Basaside Blue NB748 trade name, manufactured by BASF)

TABLE 1

| Addition amount of ink composition (g) | | Example 1 | Example 2 | Example 3 | Example 4 | Comparative Example 1 | Comparative Example 2 |
|---|---|---|---|---|---|---|---|
| Coloring material | Cyan dye solution (10%) | 20 | 20 | — | — | 20 | — |
| | Black pigment dispersion liquid (15%) | — | — | 30 | 30 | — | 30 |
| Water-soluble solvent | 1,2-pentanediol | 15 | — | 15 | — | 15 | — |
| | 3-hexyloxy-1,2-propanediol | — | 1 | — | 1 | — | 3 |
| Vinylphenol derivative | 4-vinylphenol | 0.02 | — | 0.02 | — | — | — |
| | p-hydroxy cinnamic acid | — | 1 | — | 1 | — | — |
| Moisturizing Agent | Glycerin | 10 | 15 | 10 | 15 | 10 | 11 |
| | Trimethylolpropane | — | 5 | — | 5 | — | 5 |
| Surface tension adjusting agent | Olfine E1010 | 1 | 1 | — | — | 1 | — |
| | BYK-348 | — | — | 0.6 | 0.6 | — | 0.6 |
| | Surfynol DF110D | — | — | 0.1 | 0.1 | — | 0.1 |
| Dissolution aid | 2-pyrrolidone | 3 | 3 | 2 | 2 | 3 | 2 |
| ph adjusting agent | Triethanolamine | 0.5 | 0.5 | 0.2 | 0.2 | 0.5 | 0.2 |
| | Pure water | Residue | Residue | Residue | Residue | Residue | Residue |

Example 1

0.02 g of 4-vinylphenol (as vinylphenol and/or vinylphenol derivative) were dissolved in 15 g of 1,2-pentanediol as a water-soluble solvent to give a vinylphenol solution. A water-soluble dye solution was separately prepared by mixing a solution of 20 g of C.I. Direct Blue 199 solution (dye concentration: 10%), 10 g of glycerin as a moisturizing agent, 1 g of Olfine E1010 (trade name, manufactured by Nisshin Chemical Industry Co., Ltd.) as a surface tension adjusting agent, 3 g of 2-pyrrolidone as a dissolution aid, and 0.5 g of triethanolamine as a pH adjusting agent. The vinylphenol solution and water-soluble dye solution were mixed, and pure water was further added to make the total amount 100 g. Filtration was performed with a membrane filter having a pore diameter of 0.8 μm to obtain the ink of Example 1.

Examples 2 to 4

For Examples 2 to 4, inks of Examples 2 to 4 were prepared in the same manner as in the formulation of Table 1 and Example 1.

Comparative Example 1

In contrast to Example 1, 15 g of 1,2-pentanediol as a water-soluble solvent without addition of 4-vinylphenol was Black pigment dispersion liquid: Carbon Black MA77 (trade name, manufactured by Mitsubishi Chemical Corporation)

BYK-348 (trade name, silicone-based surfactant, manufactured by BYK Japan KK)

Olfin E1010 (trade name, acetylene glycol-based surfactant, manufactured by Air Products Japan Co., Ltd.)

Surfynol DF110D (trade name, acetylene glycol-based surfactant, manufactured by Air Products Japan Co., Ltd.)

2.2. Evaluation of Ink 2.2.1. Preservation Test

The test bacteria (bacteria and fungi) were inoculated into each of the inks obtained in the Examples and Comparative Examples to be a concentration of approximately $10^5$ CFU/g and the number of viable cells after leaving at 25° C. for 24 hours was measured and evaluated according to the following evaluation criteria.

Test Bacterial Species

*Escherichia coli, Pseudomonas aeruginosa, Aspergillus oryzae*, and *Penicillium funiculosum*

Evaluation Criteria

Initial: 100,000 CFU/g

A: less than 100 CFU/g

B: 100 CFU/g or more and less than 1,000 CFU/g

C: 1,000 CFU/g or more and less than 10,000 CFU/g

D: 10,000 CFU/g or more 2.2.2. Discharge Stability Test

Each ink obtained in Examples and Comparative Examples was filled in an ink jet type printer EM-930C (trade name, manufactured by Seiko Epson Corporation), and the discharge head was removed from the suction cap and left to stand for one day. After leaving standing, cleaning was performed once, 20 pages of continuous printing was performed while all the nozzles were discharged, and the number of nozzles of print missing and bending was evaluated based on the following criteria.

Evaluation Criteria

A: Missing and bending is 0 nozzle

B: Missing and bending is 1 to 5 nozzles

C: Missing and bending is more than 6 nozzles 2.2.3. Storage Stability Test

Each of the inks obtained in Examples and Comparative Examples was placed in a sample bottle and left to be frozen at −20° C. for 1 week. The inks were then thawed and filtered to collect precipitates. Storage stability at low temperature of the inks was evaluated based on the following criteria depending on an appearance of the inks after thawing and the number of precipitates.

Evaluation Criteria

A: less than 50 precipitates/1 mL

B: 50 precipitates/1 mL or more and less than 200 precipitates/1 mL

C: 200 precipitates/1 mL or more

D: Separation of oil droplets or the like in ink

The results of the evaluation test are illustrated in Table 2 below.

TABLE 2

| Ink composition | Example 1 | Example 2 | Example 3 | Example 4 | Comparative Example 1 | Comparative Example 2 |
|---|---|---|---|---|---|---|
| Preservation test | A | A | A | A | B | A |
| Discharge stability test | A | A | A | A | A | C |
| Storage stability test | A | A | A | A | A | D |

In each of Examples 1 to 4, the preservative properties, the discharge stability, and the storage stability were satisfactory. On the other hand, in Comparative Example 1, although the discharge stability and the storage stability were satisfactory, the preservation test was inferior to that in Example 1. This fact is considered that because 4-vinylphenol (serving as a vinylphenol derivative) was not added. On the other hand, in Comparative Example 2, although the preservative properties were satisfactory, the discharge stability and the storage stability were inferior to those in Example 3. This fact is considered that because in contrast to Example 3, instead of adding a p-hydroxy cinnamic acid (serving as the vinylphenol derivative), the amount of 3-hexyloxy-1,2-propanediol was increased, and the glycerin of the moisturizing agent was reduced to make the viscosity of the ink the same as that in Example 1, so that the drying resistance of the ink decreased and the nozzle clogged. In addition, since the increased amount of 3-hexyloxy-1,2-propanediol was low in water solubility, the excess amount is oil droplets and separated, and the storage stability of the ink was decreased.

It was confirmed that each of the inks obtained in Examples 1 to 4 can be printed on the above-described fabric, exclusive paper for ink jet, wood free paper, copy paper, plastic film as the recording medium, and can be used for label printing, package printing, and textile printing.

As described above, according to the invention, at least one selected from the group consisting of vinylphenol and the vinylphenol derivative, a water-soluble organic solvent, and water are included, so that it is possible to obtain the water-based ink composition for ink jet recording, which is safe without risk of skin sensitization, excellent in the preservative performance, and the high discharge stability and storage stability.

The invention is not limited to the above-described embodiments, and various modifications are possible. For example, the invention includes a configuration (for example, a configuration in which functions, methods, and results are the same, or a configuration with the same purpose and effect) substantially the same as the configuration described in the embodiment. In addition, the invention includes a configuration in which non-essential parts of the configuration described in the embodiment are replaced. In addition, the invention includes a configuration that achieves the same operation and effect as the configuration described in the embodiment, or a configuration that can achieve the same object. In addition, the invention includes a configuration in which a publicly-known technique is added to the configuration described in the embodiment.

The entire disclosure of Japanese Patent Application No. 2017-059081, filed Mar. 24, 2017 is expressly incorporated by reference herein.

What is claimed is:

1. A water-based ink composition for ink jet recording, comprising:
   at least one compound selected from the group consisting of p-vinyl phenol, p-hydroxy-2-methylacrylanilide, p-hydroxy cinnamic alcohol, 4-hydroxy cinnamic acid, p-sinapyl alcohol, and coniferyl alcohol;
   a water-soluble organic solvent; and
   water,
   wherein the water-soluble organic solvent is at least one selected from the group consisting of 1,2-pentanediol, 1,2-hexanediol, 1,3-hexanediol, 1,2-heptane diol, 1,2-octanediol, 3-butoxy-1,2-propanediol, 3-pentyloxy-1,2 propanediol, and 3-(hexyloxy)-1,2-propanediol.

2. The water-based ink composition for ink jet recording according to claim 1, further comprising:
   a coloring material,
   wherein the coloring material is at least one selected from the group consisting of a pigment and a dye.

3. The water-based ink composition for ink jet recording according to claim 1,
   wherein the content of the at least one compound is 0.01% by mass or more and 1.0% by mass or less.

4. The water-based ink composition for ink jet recording according to claim 1,
   wherein the content of water is 60% by mass or more.

5. The water-based ink composition for ink jet recording according to claim 1, wherein the water-soluble organic solvent has a water-octanol partition coefficient (expressed as log P value) of 0.0 or more and 1.5 or less.

6. The water-based ink composition for ink jet recording according to claim 1,
wherein the content of the water-soluble organic solvent is 0.5% by mass or more and 15% by mass or less.

7. The water-based ink composition for ink jet recording according to claim 1,
wherein a biocidal antibacterial agent or antifungal agent other than the at least one compound is present in an amount of not more than 1% by mass.

8. A coloring material liquid comprising:
at least one compound selected from the group consisting of p-vinyl phenol, p-hydroxy-2-methylacrylanilide, p-hydroxy cinnamic alcohol, 4-hydroxy cinnamic acid, p-sinapyl alcohol, and coniferyl alcohol;
a water-soluble organic solvent;
water; and
a coloring material,
wherein the water-soluble organic solvent is at least one selected from the group consisting of 1,2-pentanediol, 1,2-hexanediol, 1,3-hexanediol, 1,2-heptane diol, 1,2-octanediol, 3-butoxy-1,2-propanediol, 3-pentyloxy-1,2 propanediol, and 3-(hexyloxy)-1,2-propanediol.

\* \* \* \* \*